United States Patent Office.

FRITZ BENDER, OF MÜHLHEIM-ON-THE-MAIN, GERMANY, ASSIGNOR TO A. LEONHARDT & CO., OF SAME PLACE.

PRODUCTION OF COLORING-MATTER.

SPECIFICATION forming part of Letters Patent No. 395,115, dated December 25, 1888.

Application filed March 24, 1887. Serial No. 232,270. (No specimens.)

*To all whom it may concern:*

Be it known that I, FRITZ BENDER, a subject of the Emperor of Germany, residing at Mühlheim-on-the-Main, in the Grand Duchy of Hesse, have invented a new and useful Improvement in Coloring-Matter, of which the following is a specification.

The yellow coloring-matters which have been heretofore obtained from paranitrotoluolsulpho-acid by treating it with alkaline lye when dyed on cotton and treated with soap or weak alkalies show a change from the yellow color to red.

My invention consists in the fast-yellow coloring-matter hereinafter described, obtained from the unstable coloring-matters above-mentioned by treating said matters with chlorinating, brominating, nitrating, or alkylating agents.

If treatment with alkyles—as methyl or ethyl alcohol—is to be employed, it is preferable to transform the above-mentioned unstable yellow coloring-matter first into the yellow coloring-matter mentioned in Letters Patent No 350,229, October 5, 1886.

As examples for my process, I give the following directions:

First. 6.2 kilograms of the coloring-matter obtained from paranitrotoluolsulpho-acid by treatment with alkaline lye and then converted into the yellow dye-stuff described in Letters Patent No. 350,229, October 5, 1886, are, together with 2.5 kilograms of lye of thirty per cent., three kilograms of benzyl-chloride, and ten liters of spirit, heated for several hours in the reflux-cooler. The spirit is then distilled and unchanged phenol coloring-matter is removed with hot alkaline water. The benzylated coloring-matter formed remains upon the filter, the said coloring-matter being indifferent to soap and alkali.

Second. 6.2 kilograms of the coloring-matter obtained from paranitrotoluolsulpho-acid by treatment with alkaline lye and then converted into the yellow dye-stuff described in Letters Patent No. 350,229, October 5, 1886, are, together with thirty liters of water, 2.5 kilograms of lye of thirty per cent., and six kilograms of ethyl bromide, heated in iron autoclaves for eight hours from seventy degrees to eighty degrees. After the cooling and opening of the autoclaves, the ethylated coloring-matter is filtered and freed from the unchanged phenol coloring-matter by washing with alkaline dilute salt-water. The ethylation can also be effected by means of ethylic sulphate of soda in a spirituous solution at one hundred and forty to one hundred and fifty degrees. The isolation of the ethylated coloring-matter is for the rest quite analogous.

Third. Ten kilograms of the red product of condensation obtained from paranitrotoluolsulpho-acid by means of soda-lye are, together with one hundred liters of water and nine kilograms of nitric acid of 40° Baumé, heated for several hours in the reflux-cooler. The liquid is then neutralized and the nitrated coloring-matter salted out.

Fourth. Ten kilograms of the product of condensation mentioned in clause 3 are dissolved hot in two hundred liters of water, and to the cooled liquid are added, first, twenty-five kilograms of lye of thirty per cent., then gradually eight kilograms of bromine. After standing for some time, acidification is caused with diluted sulphuric acid until an odor of bromine is perceived, alkalization is again effected, and the brominated coloring-matter is salted out.

I wish it to be understood that I do not limit my invention to the precise proportions as to quantity and concentration hereinabove given; and I wish to state particularly that a larger proportion of nitric acid may be employed without any change of result.

The coloring-matter thus obtained has the properties of being soluble in water, giving a yellow solution, which, when treated with chloride of sodium or of barium, gives a yellow precipitate, and when treated with soda-lye does not change its color to red, and which is capable of dyeing wool, cotton, or silk a yellow color unchangeable by soap or alkalies.

What I claim as my invention, and desire to secure by Letters Patent, is—

The fast-yellow coloring-matter herein described, obtained from paranitrotoluolsulpho-acid, having the properties of being soluble in water, giving a yellow solution, which, when treated with chloride of sodium or of barium, gives a yellow precipitate, and when treated with soda-lye does not change its color to red, substantially as herein specified.

In testimony whereof I have signed my name to this specification in the presence of two subscribing witnesses.

FRITZ BENDER.

Witnesses:
FRANZ HASSLACHER,
JOSEPH PATRICK.